US010463957B2

(12) United States Patent
Byskal et al.

(10) Patent No.: US 10,463,957 B2
(45) Date of Patent: Nov. 5, 2019

(54) CONTENT DEPLOYMENT, SCALING, AND TELEMETRY

(71) Applicant: Amazon Technologies, Inc., Seattle, WA (US)

(72) Inventors: Christopher David Byskal, Issaquah, WA (US); Preston Alan Tamkin, Seattle, WA (US); Alexis Levasseur, Seattle, WA (US); Jonathan Paul Thompson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

(21) Appl. No.: 14/660,821

(22) Filed: Mar. 17, 2015

(65) Prior Publication Data

US 2016/0277483 A1 Sep. 22, 2016

(51) Int. Cl.
*A63F 13/35* (2014.01)
*G06F 9/455* (2018.01)
(Continued)

(52) U.S. Cl.
CPC ............ *A63F 13/35* (2014.09); *A63F 13/352* (2014.09); *A63F 13/355* (2014.09);
(Continued)

(58) Field of Classification Search
CPC ......... H04L 67/14; G06F 2009/45562–45575; G06F 9/45558; G06F 9/45595; G06F 2009/4557; A63F 13/35; A63F 13/60
See application file for complete search history.

(56) References Cited

U.S. PATENT DOCUMENTS 9,081,594 B1 7/2015 Labonte et al.
9,178,908 B2 11/2015 Call et al.
(Continued)

FOREIGN PATENT DOCUMENTS

JP 2000-033182 A 2/2000
JP 2012-195854 A 10/2012
(Continued)

OTHER PUBLICATIONS

Microsoft, Moving Applications to the Cloud, Jun. 2012, 2nd edition, pp. 1-128.*
(Continued)

*Primary Examiner* — Gregory G Todd
(74) *Attorney, Agent, or Firm* — BakerHostetler

(57) ABSTRACT

Techniques for content deployment, scaling and telemetry are described herein. Once a content item is made accessible for deployment, one or more instances of the content item may be installed as an image on a virtual machine instance. Additional instances of the content item may then be launched on the same virtual machine instance and/or by copying the image onto any number of additional virtual machine instances. One or more instances of a content item may be configurable to execute with multiple simultaneously assigned users sessions. Information associated with content item instances may be collected, such as a number of occupied user sessions, a number of unoccupied user sessions, content item instance duration, memory usage, and the like. This information may, in some cases, be used to match and assign authorized users to appropriate content item instances.

20 Claims, 7 Drawing Sheets

(51) Int. Cl.
*A63F 13/60* (2014.01)
*H04W 4/21* (2018.01)
*H04L 29/08* (2006.01)
*H04L 29/06* (2006.01)
*A63F 13/355* (2014.01)
*A63F 13/358* (2014.01)
*A63F 13/352* (2014.01)
*A63F 13/71* (2014.01)

(52) U.S. Cl.
CPC ............ *A63F 13/358* (2014.09); *A63F 13/60* (2014.09); *A63F 13/71* (2014.09); *G06F 9/45558* (2013.01); *H04L 63/102* (2013.01); *H04L 67/2804* (2013.01); *H04L 67/306* (2013.01); *H04W 4/21* (2018.02); *G06F 2009/4557* (2013.01); *G06F 2009/45562* (2013.01); *G06F 2009/45575* (2013.01); *H04L 63/083* (2013.01)

(56) References Cited

U.S. PATENT DOCUMENTS

| | | | |
|---|---|---|---|
| 9,374,660 B1 | 6/2016 | Tilles | |
| 9,448,819 B1 | 9/2016 | Adogla | |
| 9,542,174 B2* | 1/2017 | Di Cocco | G06F 9/4416 |
| 9,703,651 B2 | 7/2017 | Hanumantharaya et al. | |
| 9,952,946 B2 | 4/2018 | Zhu et al. | |
| 2007/0093297 A1 | 4/2007 | Moshal | |
| 2012/0072780 A1* | 3/2012 | Kini | G06F 11/3466 |
| | | | 714/47.2 |
| 2012/0198345 A1* | 8/2012 | von Eicken | H04L 67/00 |
| | | | 715/735 |
| 2012/0226808 A1 | 9/2012 | Morgan | |
| 2013/0007731 A1* | 1/2013 | Fries | G06F 9/45558 |
| | | | 718/1 |
| 2013/0196777 A1 | 8/2013 | Hill | |
| 2013/0274020 A1* | 10/2013 | Novotny | A63F 13/12 |
| | | | 463/42 |
| 2014/0024457 A1 | 1/2014 | Justice et al. | |
| 2014/0040887 A1 | 2/2014 | Morariu et al. | |
| 2014/0143300 A1* | 5/2014 | Karlsson | H04L 67/101 |
| | | | 709/203 |
| 2014/0173594 A1 | 6/2014 | Ng et al. | |
| 2014/0228108 A1 | 8/2014 | Bruno, Jr. et al. | |
| 2014/0245319 A1 | 8/2014 | Fellows | |
| 2014/0342819 A1* | 11/2014 | Bruno, Jr. | A63F 13/12 |
| | | | 463/29 |
| 2014/0344439 A1* | 11/2014 | Kempf | H04L 41/50 |
| | | | 709/224 |
| 2015/0019715 A1 | 1/2015 | Ronen et al. | |
| 2015/0106520 A1* | 4/2015 | Breitgand | G06F 9/45558 |
| | | | 709/226 |
| 2015/0106805 A1 | 4/2015 | Melander et al. | |
| 2015/0125133 A1 | 5/2015 | Kim et al. | |
| 2015/0281110 A1 | 10/2015 | Chow | |
| 2015/0331703 A1 | 11/2015 | Kelly et al. | |
| 2015/0350021 A1* | 12/2015 | Morris | H04L 41/0816 |
| | | | 709/224 |
| 2015/0355927 A1 | 12/2015 | Budzinski | |
| 2016/0044011 A1 | 2/2016 | Gordon et al. | |
| 2016/0094720 A1* | 3/2016 | Girard | G06Q 20/145 |
| | | | 379/114.03 |
| 2016/0256784 A1 | 9/2016 | Schultz et al. | |
| 2016/0269229 A1 | 9/2016 | Franke et al. | |
| 2017/0316652 A1* | 11/2017 | Siebert | G07F 17/3241 |

FOREIGN PATENT DOCUMENTS

| | | |
|---|---|---|
| JP | 2013-109548 A | 6/2013 |
| JP | 2014-135049 A | 7/2014 |
| WO | WO 2015/118377 A1 | 8/2015 |

OTHER PUBLICATIONS

International Patent Application No. PCT/US2016/022791; Int'l Preliminary Report on Patentability; dated Sep. 28, 2017; 14 pages.

* cited by examiner

CONTENT DEPLOYMENT, SCALING, AND TELEMETRY

CROSS-REFERENCE TO RELATED APPLICATIONS

This application is related to the following applications, which are hereby incorporated by reference in their entirety: U.S. patent application Ser. No. 14/660,850, filed Mar. 17, 2015, entitled "CONTENT DEPLOYMENT, SCALING, AND TELEMETRY"; and U.S. patent application Ser. No. 14/660,865, filed Mar. 17, 2015, entitled "CONTENT DEPLOYMENT, SCALING, AND TELEMETRY".

BACKGROUND

In recent years, the use of electronically presented content has become increasingly popular and widespread. In some examples, certain electronically presented content, such as multi-player games, may be simultaneously accessed and engaged by large numbers of different users. To make their content readily available to users, content developers are often forced to become experts in server deployment and management technologies that they would otherwise have no interest to invest in. In particular, many content developers would prefer to concentrate on the creative aspects of the content that is being developed. Many content developers view server deployment and management as a distraction from their core business of trying to create content, make it enjoyable, and ship it on time. In addition to the time necessary to gain expertise with server-based deployment and management systems, many content developers are often dissatisfied with other features of these systems. For example, many content developers are often dissatisfied with the level of feedback received from such systems regarding the operation and use of their content. The availability of such feedback may often be limited and difficult to obtain.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
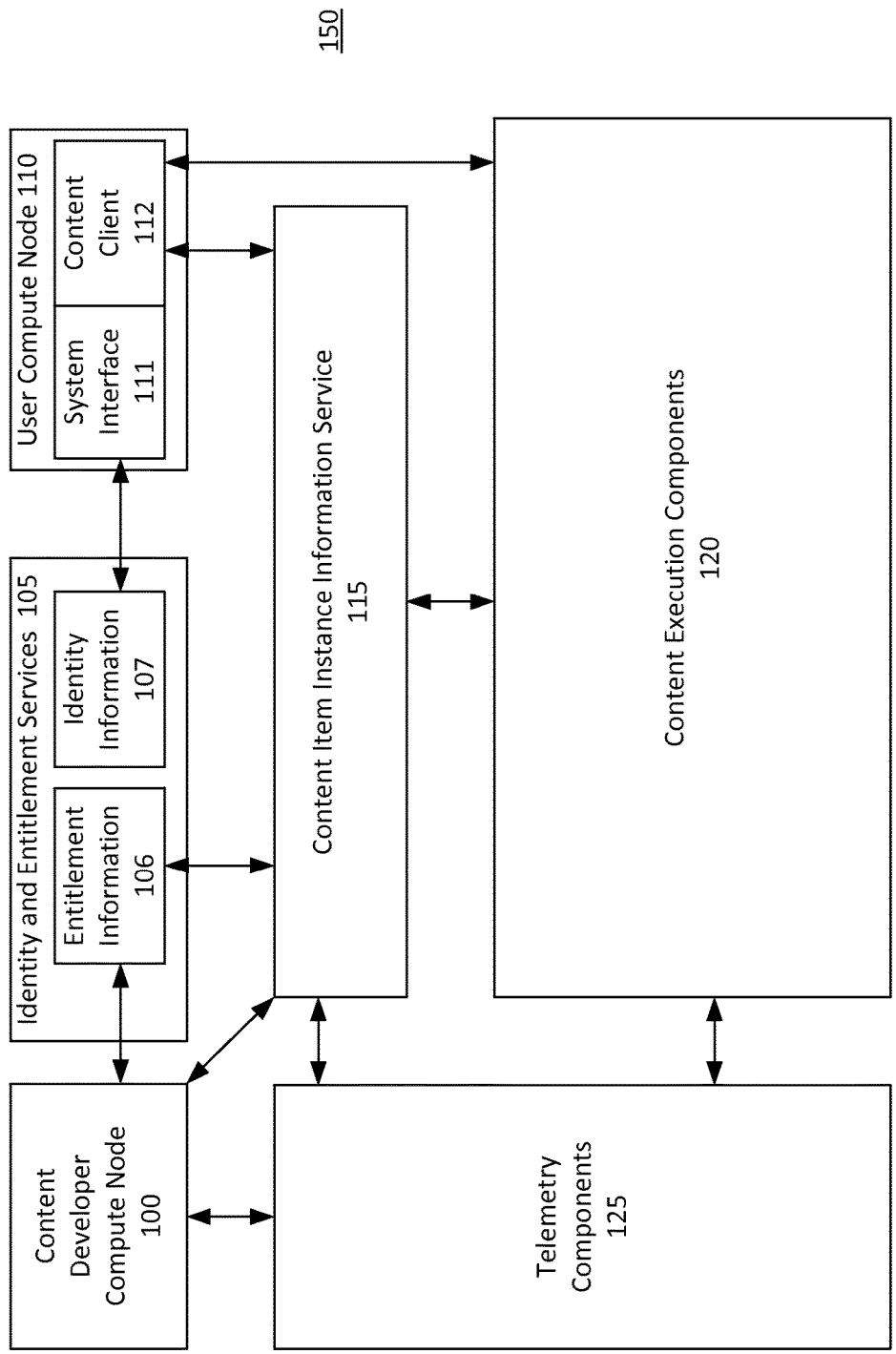
FIG. 1 is a diagram illustrating an example content deployment, scaling and telemetry system that may be used in accordance with the present disclosure.

Techniques for content deployment, scaling and telemetry are described herein. In some examples, a content developer or other party may provide various types of electronically presented content items, such as video games and other applications, for deployment to various users. In some cases, different versions of content, such as content that is being tested and/or content that is fully developed, may be provided and made available at the same or different times. In some examples, the content may be created using a software development kit (SDK) or other elements that are associated and/or integrated with various backend or other services or components that may host or otherwise interact with deployed instances of the content item, such as a content item instance information service, an instance interface, and/or content execution components, which are each described in detail below. In these examples, the SDK or other elements may provide code and other functionality built-in to the content created by the developer that may, for example, allow ingestion, configuration, provisioning and deployment of the content to be more easily and rapidly accomplished, such as by allowing the content to interact more efficiently with a multi-player video gaming or other multi-user environment. For example, an SDK used to create the content may assist in configuration of new user sessions for one or more users and collection of information about executing content item instances, such as a number of occupied user sessions, a number of unoccupied user sessions, content item instance duration, memory usage, and the like.

In addition to the content itself, developers and other parties may also provide information associated with identities of various users that are authorized to use the content and, in some cases, respective content entitlements for various users. For example, if different builds and/or versions of content are available, different authorized users may be indicated for the different builds and/or versions. Once a content item is made accessible for deployment, one or more instances of the content item may be installed as an image on a virtual machine instance. Additional instances of the content item may then be launched on the same virtual machine instance and/or by copying the image onto any number of additional virtual machine instances. By way of these and other techniques, the content item may be made to available to large numbers of users in a rapid, efficient, reliable and secure manner.

In some examples, the deployed content may be designed to allow multiple different users to control and interact with the content, such as may occur in a multiplayer video game or other multi-user applications. In order to allow such multi-user control and interaction, the disclosed techniques may employ concepts such as user sessions and content item instances. In some examples, one or more instances of a content item may be configurable to execute with multiple simultaneously assigned users sessions. This may, for example, allow multiple users to play with or against one another, or to otherwise collaborate to provide input and receive output from an executing content item instance. Each content item instance may, in some cases, have an associated quantity of available user sessions. In some examples, information associated with content item instances may be collected, such as a number of occupied user sessions, a number of unoccupied user sessions, content item instance duration, memory usage, and the like. This information may, in some cases, be used to match and assign authorized users to appropriate content item instances. For example, in some cases, when an authorized user connects to the system, the user may indicate certain user content preferences, such as preferred plot lines, story arcs, virtual locations, levels, modes, characters, weapons, and the like. This preference information may be used to match a user to a particular content item instance having at least one unoccupied user session. In some examples, if no such content item instance is available, then an additional content item instance may be initiated that may better accommodate the user's preferences.

As set forth above, in some examples, information associated with content item instances may be collected, such as a number of occupied user sessions, a number of unoccupied user sessions, content item instance duration, memory usage, and the like. In some cases, this information may be provided periodically to a routing function that routes the information to one or more available recipients. In some examples, the available recipients may be associated with a content item instance information service, a content item fleet information service, and a historical information service, and others. The content item instance information service may, for example, provide information for matching and assignment of user sessions to content item instances, launching of new content item instances, and content item instance-level feedback and metrics to content developers and other parties. The content item fleet information service may, for example, provide content item fleet-level feedback and metrics to developers and other parties. A content item fleet is a grouping of instances of the same or related content items, such as a grouping of content item instances that are all executing the same version of a content item. The historical information service may, for example, provide historical feedback and metrics to developers and other parties. In some examples, the routing function and/or processing functions for the content item instance information service, the content item fleet information service, and historical information service may be distributed computing-based (e.g., cloud-based) functions that execute code based, at least in part, on events, such as the receiving of telemetry information for routing and/or processing. Generally speaking, such cloud-based functions, and service providing such functions, can run code in response to events and automatically manage the compute resources. In addition, such cloud-based functions and services may start running the code or trigger computing resources in a small amount of time, and those computing resources can be eliminated once the code has been run.

A diagram of an example content deployment, scaling and telemetry system 150 that may be used in accordance with the present disclosure is shown in FIG. 1. As shown, content developer compute node 100 may include, for example, various interfaces, consoles, and/or dashboards operated by content developers or other parties. User compute node 110 may communicate with identity and entitlement services 105, content item instance information service 115, and/or telemetry components 125 using, for example, one or more networks, including one or more wide area networks (WANs) such as the Internet and/or one or more local area networks (LANs). As should be appreciated, although only a single developer compute node 100 is shown in FIG. 1, system 150 may include any number of different developers and other parties deploying any number of different content items. In some cases, content developer compute nodes 100 may execute one or more integrated development environment (IDE) applications, or portions thereof, to assist in development of content. Generally, as will be described in greater detail below, content developer compute node 100 may allow, for example, developers to design and develop content items, to provide access to content items for deployment, to provide user identity and/or entitlement information, to monitor and obtain feedback and metrics associated with content item instances, content item fleets, and historical information, and other operations. As will also be described in greater detail below, when a developer is ready to deploy a certain content item, information for accessing the content may, for example, be provided to content execution components 120, which may perform various operations for executing instances of the content item, which are made accessible to various users.

In some examples, in addition to developing and providing of content, developers and other parties may also provide identity and/or entitlement information for various users to access the provided content. In particular, developer compute node 100 may sometimes interact with identity and entitlement services 105 to provide this identity and/or entitlement information. In other examples, information may be provided to identity and entitlement services 105 by other parties. In some cases, developers or other parties may configure an identity pool by providing indications of authorized users that may access one or more content items. In some examples, identity and entitlement services 105 may generate or receive identity authentication information, such as user names, passwords, and the like, for authenticating the identities of various users. User identities and their associated authentication information may be stored, for example, in identity information 107. Also, in some examples, developers or other parties may provide entitlement information 106, which may indicate the content items with which each authorized user is entitled to interact. In some examples, certain users may only be permitted to access test versions, or fully developed versions, certain versions for which the user has paid or subscribed, or any other types of content.

User compute node 110 may be employed by a user to request access to content, such as a user session for interaction with a particular content item instance. User compute node 110 may communicate with identity and entitlement services 105, content item instance information service 115, and/or content execution components 120 using, for example, one or more networks, including one or more wide area networks (WANs) such as the Internet and/or one or more local area networks (LANs). As should be appreciated, although only a single user compute node 110 is shown in FIG. 1, system 150 may include any number of different users accessing the same or different content. In some cases, in order for a user to requests access to content, a determination may be made of whether the user is authorized to access content that is deployed by system 150. In some examples, system interface 111 may provide identity authentication information for the user to identity and entitlement services 105, which may attempt to match the provided user identity authentication information to identity authentication information for the user that is stored in identity information 107. If no match is determined, then the user may, for example, be denied access to any content and/or may be prompted to register, pay, and/or subscribe for access to content and/or may be redirected to various services for performing those operations. If, on the other hand, the user's provided identity authentication is matched to stored identity authentication information, then the user's identity may be authenticated and the user may be permitted to further interact with system 150 and request access to content.

Content client 112 of user compute node 110 may then communicate with content item instance information service 115 to provide information about the user to content item instance information service 115. In turn, content item instance information service 115 may communicate with identity and entitlement services 105 to determine, based at least in part on entitlement information 106, content that the user is authorized for and entitled to access. As will be described in greater detail below, the user may then request access to a selected content item that the user is entitled access, and content item instance information service 115 may match and assign a user session for the user to a particular instance of the selected content item that executes within content execution components 120. This assignment information may be forwarded to content execution components 120, which may establish communications between content client 112 and its assigned matched content item instance.

In addition to scaling and executing of content, content execution components 120 may also collect various telemetry information about executing content item instances, such as a number of occupied user sessions, a number of unoccupied user sessions, content item instance duration, memory usage, and the like. Content execution components 120 may provide this collected telemetry information to telemetry components 125, which, as will be described in greater detail below, may route and process the telemetry data. For example, telemetry components may provide content item instance information to content item instance information service 115. This content item instance information may, for example, enable matching and assignment of user sessions to content item instances, launching of new content item instances, and content item instance-level feedback and metrics to content developers and other parties. In addition to content item instance information service 115, telemetry information may also be provided to other services, such a content item fleet information service and a historical information service. These and other telemetry data services are described in greater detail below with reference to FIG. 3.

Figure 2:
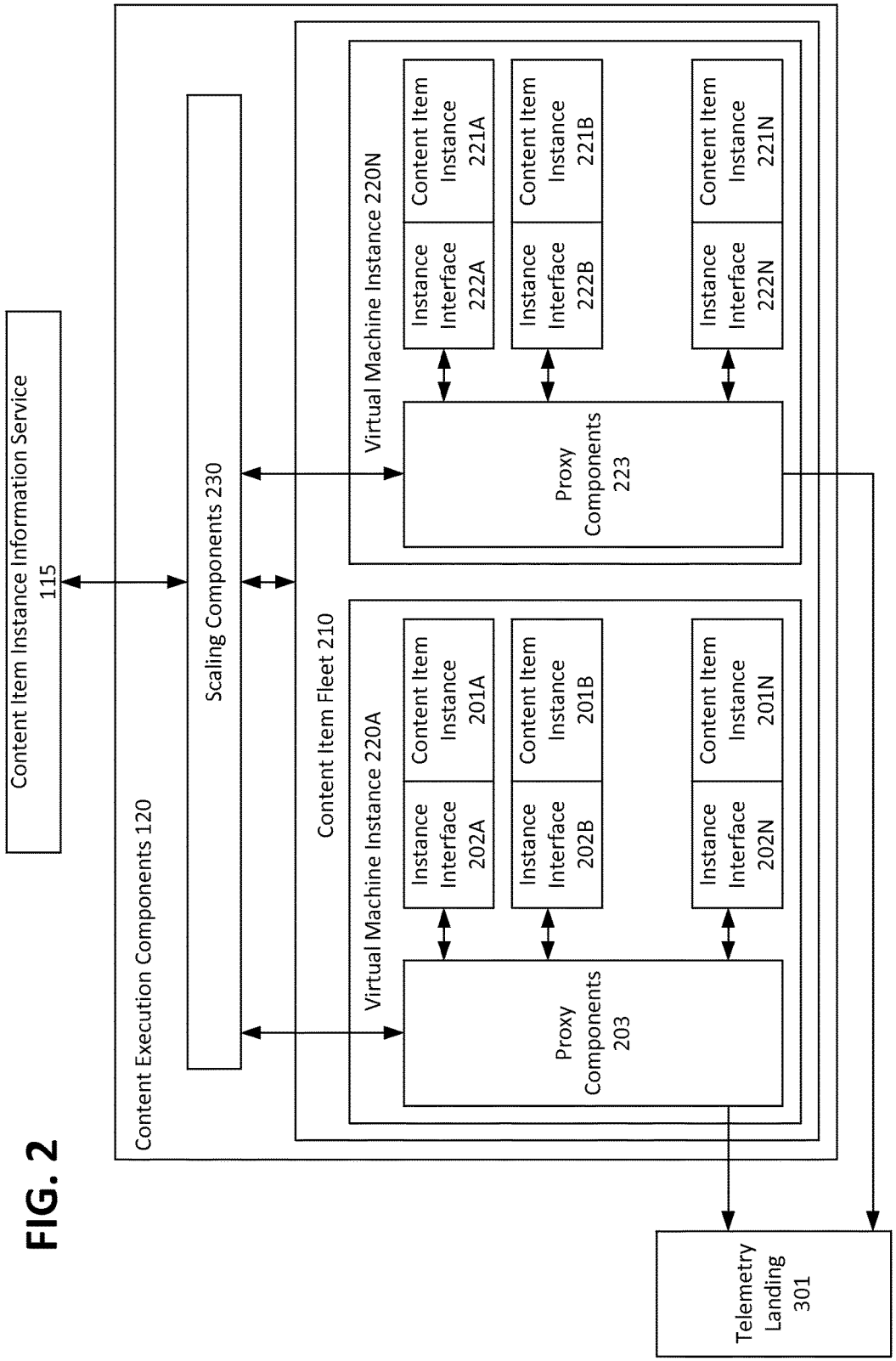
FIG. 2 is a diagram showing an example content scaling and execution system that may be used in accordance with the present disclosure.

FIG. 2 is a diagram showing an example content scaling and execution system that may be used in accordance with the present disclosure. As shown in FIG. 2, content execution components 120 (also shown in FIG. 1) include scaling components 230, which may perform various operations for scaling deployed content. In particular, when a content item is ready for deployment using system 150, a message may be sent via developer compute node 100 indicating that the content item is ready for deployment and providing information for accessing the content, such as location and/or address information. In some examples, the developer may also provide additional information such as a name for the content item fleet, a development stage, and a description of the content item. The access information and, in some cases, additional information may be provided to content scaling component 230, which may issue instructions to install one or more instances of the content item as an image on a virtual machine instance. As will be described in greater detail below, additional instances of the content item may then be launched on the same virtual machine instance and/or by copying the image onto any number of additional virtual machines instances.

A grouping of content item instances for the deployed content item is referred to as the content item fleet. In FIG. 2, content execution components 120 execute an example content item fleet 210. As should be appreciated, although only a single content item fleet 210 is shown in FIG. 2, content execution components 120 may execute any number of different content item fleets at the same or different times. In the particular example of FIG. 2, content item fleet 210 includes two virtual machine instances 220A and 220N, each executing three content item instances. In particular, virtual machine instance 220A executes content item instances 201A-N, while virtual machine instance 220N executes content item instances 221A-N. It is noted, however, that a content item fleet in accordance with the disclosed techniques may include any number of virtual machine instances each executing any number of different content item instances. In some examples, one or more of content item instances 201A-N and 221A-N, and in some cases all of content item instances 201A-N and 221A-N, may be configurable to execute with multiple simultaneously assigned users sessions. This may, for example, allow multiple users to play with or against one another, or to otherwise collaborate within a single content item instance, such as may occur in a multiplayer video game or other multi-user applications.

In some examples, each content item instance 201A-N and 221A-N may receive input, such as control input (e.g., character movement, weapons firing, menu selections, etc.), from its assigned user sessions. Also, in some examples, each content item instance 201A-N and 221A-N may then transmit content information, such as state data updates, event data updates and other information to user compute nodes for the assigned user sessions. The user compute nodes may use this data to render and present content at their respective content compute nodes. In some examples, each user node may include one or more graphics processing units (GPUs) for rendering of graphics data associated with the content item.

In some other examples, content may be rendered by content execution components 120 based on content information that is generated and/or maintained by the content item instances 201A-N and 221A-N. In these examples, content item instances 201A-N and 221A-N may, in some cases, each have access to one or more GPUs. The rendered content may then be transmitted by the content item instances 201A-N and 221A-N to user compute nodes for the assigned user sessions.

As shown in FIG. 2, each content item instance 201A-N and 221A-N includes a respective instance interface 202A-N and 222A-N. In some examples, each instance interface 202A-N and 222A-N may be associated with and/or implemented using a software development kit (SDK) and may assist in enabling configuration of a content item instance, initiation of user sessions in the content item instance, and collection of information from the content item instance, such as telemetry information. For example, in some cases, various instructions associated with instance interfaces 202A-N and 222A-N, such as one or more SDKs, may be exposed and/or provided to developers. These instructions may assist in enabling the content item instances 201A-N and 221A-N to perform the tasks described above and possibly other tasks. The developers may, in turn, include, embed or otherwise associate these instructions with the content item that is made accessible for deployment. Telemetry information provided by instance interfaces 202A-N and 222A-N may include, for example, information about executing content item instances, such as a number of occupied user sessions, a number of unoccupied user sessions, content item instance duration, memory usage, and the like.

As also shown in FIG. 2, instance interfaces 202A-N may communicate with proxy component 203 for virtual machine instance 220A, while instance interfaces 222A-N may communicate with a proxy component 223 for virtual machine instance 220N. Proxy components 203 and 223 may generally allow exchange of information and commands between content items 202A-N and 222A-N and components external to virtual machine instances 220A-N, such as scaling components 230 and telemetry landing 301. In particular, in some examples, proxy components 203 and 223 may receive commands from scaling components 230, such as commands to launch content item instances and commands to add a user sessions to a particular content item instance. In some examples, proxy components 203 and 223 may also provide information to scaling components 230 and/or telemetry landing 301 about executing content item instances. The information provided by proxy components 203 and 223 may include, for example, any of the information collected by instance interfaces 202A-N and 222A-N, such as any of the telemetry information described above or other relevant information. Proxy components 203 and 223 may provide content item instance information at any desired interval, such as at regular repeating intervals (e.g., every minute or every five minutes), in response to particular events or conditions, in continuous or intermittent streams, or using any combination of these or other techniques.

In some examples, scaling components 230 may monitor content item fleet 210 based on, for example, information provided by proxy components 203 and 223 such as described above. In some cases, scaling components 230 may use this information to automatically scale content item fleet 210 by allocating additional virtual machine instances and/or content item instances to the content item fleet 210 and/or by de-allocating existing virtual machine instances and/or content item instances from the content item fleet 210. In some examples, certain configurable conditions may cause scaling components 230 to allocate additional virtual machine instances and/or content item instances to a content item fleet. These conditions may include for example, determining that the total and/or average number of unoccupied user sessions for all content item instances in the fleet have met or dropped below a particular quantity, determining that the total number of unoccupied user sessions for one or more individual content item instances in the fleet have met or dropped below a particular quantity, and/or other conditions. Also, in some examples, scaling components 230 may allocate additional virtual machine instances and/or content item instances to a content item fleet based on a determination that a particular sub-set of a content item fleet, such as a sub-set of content item instances having particular content attributes (e.g., modes, virtual locations, characters, weapons, plot lines, story arcs, etc.) meets any of the example allocation conditions described above or other conditions.

Also, in some examples, certain configurable conditions may cause scaling components 230 to de-allocate virtual machine instances and/or content item instances from a content item fleet. These conditions may include for example, determining that the total and/or average number of unoccupied user sessions for all content item instances in the fleet have met or exceeded a particular quantity, determining that the total number of unoccupied user sessions for one or more individual content item instances in the fleet have met or exceeded a particular quantity, and/or other conditions. Also, in some examples, scaling components 230 may de-allocate virtual machine instances and/or content item instances from a content item fleet based on a determination that a particular sub-set of a content item fleet, such as a sub-set of content item instances having particular content attributes (e.g., modes, virtual locations, characters, weapons, plot lines, story arcs, etc.) satisfies any of the example de-allocation conditions described above or other conditions. The de-allocated virtual machine may then eventually be terminated and/or re-purposed. It is noted that, in some cases, it may not be advantageous to terminate and/or repurpose a particular virtual machine instance immediately upon determining that a de-allocation condition has occurred. This is because the virtual machine instance selected for de-allocation may still be executing content item instances with assigned user sessions. In some examples, a determination may be made to stop assigning additional user sessions to content item instances on the virtual machine instance that is selected for de-allocation. The de-allocated virtual machine instance may then be terminated and/or re-purposed once the currently existing user sessions have expired.

Figure 3:
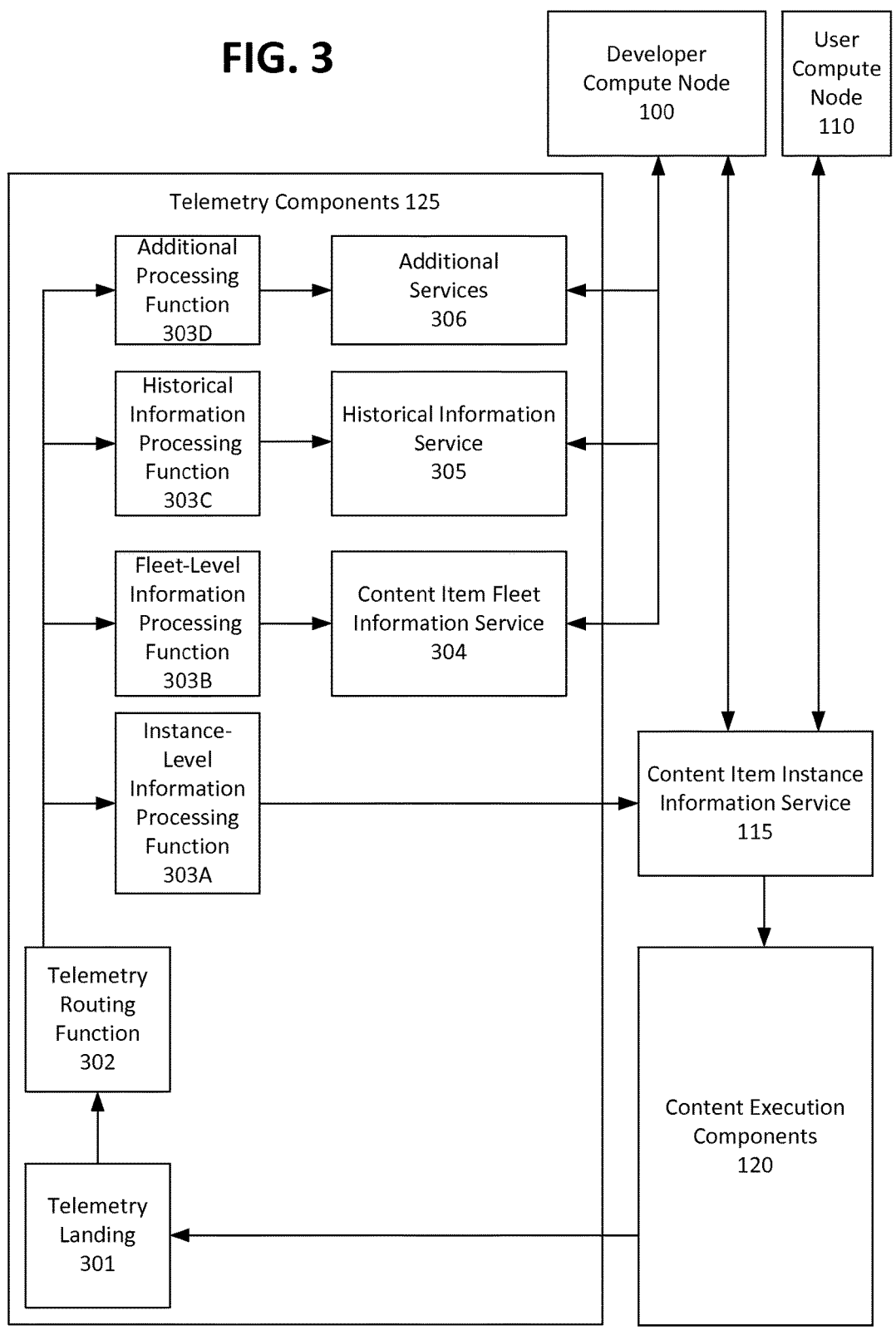
FIG. 3 is a diagram illustrating an example telemetry information routing and processing system that may be used in accordance with the present disclosure.

As set forth above, in addition to providing information to scaling components 230, proxy components 203 and 223 may provide information to telemetry landing 301. This information may be routed and processed by various telemetry components, which are now described in detail. In particular, FIG. 3 is a diagram illustrating an example telemetry information routing and processing system that may be used in accordance with the present disclosure. As shown in FIG. 3, information provided by content execution components 120 (including, for example, proxy components 203 and 223, as shown in FIG. 2) may be delivered to telemetry landing 301 of telemetry components 125 (also shown in FIG. 1). Upon being delivered to telemetry landing 301, telemetry information may be accessed by telemetry routing function 302, which may generally examine the provided information and, based on various factors, route the provided information to one or more recipients, such as processing functions 303A-D. In particular, instance-level processing function 303A receives and processes information for content item instance information service 115 (also shown in FIGS. 1 and 2). Fleet-level information processing function 303B receives and processes information for content item fleet information service 304. Historical information processing function 303C receives and processes information for historical information service 305. Additionally, telemetry routing function 302 may route information to any number of additional processing functions 303D that may receive and process information for any number of additional services 306.

In some examples, when writing telemetry information to telemetry landing 301, proxy components 203 and 223 may tag or otherwise identify the information with certain keys or other identification information according to a set of conventions. These conventions may assist the telemetry routing function 302 to quickly and efficiently route the telemetry information to appropriate recipients. For example, in some cases, the telemetry information may be identified using the following format: fleet identifier/instance identifier/route identifier/timestamp/globally unique identifier (GUID). The fleet identifier may be an identifier for the particular content item fleet with which the information is associated. The instance identifier may be an identifier for the particular content item instance with which the information is associated. The route identifier may be an identifier that indicates one or more recipients (e.g., any or all of processing functions 303A-D) to which the information should be sent. The timestamp may be a timestamp associated with the information, such as a time at which the information is collected. In some cases, this identification information may be all that is required for the telemetry routing function 302 to route respective telemetry information to the appropriate recipients.

In some examples, any of telemetry routing function 302 and/or processing functions 303A-D may be distributed computing-based (e.g., cloud-based) functions that execute code based, at least in part, on events, such as the receiving of telemetry information for routing and/or processing. For example, in some cases, telemetry routing function 302 may detect and/or may be informed of the receiving of telemetry information at telemetry landing 301. In response to this, telemetry routing function 302 may automatically initiate execution of code for routing the telemetry information, based on, for example, the identification information such as described above. Likewise, processing functions 303A-D may then detect and/or may be informed of telemetry information that has been routed thereto, and may then automatically initiate execution of code for processing the received information, such as by organizing and storing the received information and generating any appropriate alarms or notifications. In some examples, implementation of telemetry routing function 302 and/or processing functions 303A-D using distributed computing-based (e.g., cloud-based) functions that execute code based, at least in part, on events may be advantageous by, for example, reducing the amount of computing resources and cost that may be required for routing and/or processing services that maintained a constant execution even during times when no new telemetry information was available for routing and/or processing.

Content item instance information service 115 may generally receive and provide information regarding individual content item instances executed by content execution components 120, including, for example, content item instances 201A-N and 221A-N of FIG. 2. This information may include, for example, a number of occupied user sessions for each executing content item instance, a number of unoccupied user sessions for each executing content item instance, content item instance duration information, memory usage by in each executing content item instance, and the like. Content item instance information service 115 may use this information, for example, to assist in matching and assigning of user sessions to particular content item instances. In particular, referring back to FIG. 1, it is seen that content client 112 of user compute node 110 may communicate with content item instance information service 115 to request information about available content and to request access to available content. As also shown in FIG. 1, content item instance information service 115 may communicate with identity and entitlement services 105 to determine, based at least in part on entitlement information 106, which content items the user is entitled to access. It is noted that entitlement information 106 may indicate user entitlements at various different levels of granularity. For example, in some cases, entitlement information 106 may indicate whether the user is generally allowed access to the content executed by system 150. In other cases, entitlement information 106 may be provided at finer granularity levels and may indicate particular content to which the user is entitled to access, such as particular titles, particular versions, particular story arcs or plotlines, particular virtual locations, particular modes, particular characters, particular weapons, and the like.

In some examples, content client 112 may request that content item instance information service 115 provide information about available content items that the user is entitled to access, such as a listing of all available content items or content items having certain content attributes, such as certain plot lines, story arcs, virtual locations, levels, modes, characters, weapons, and the like. Upon receiving this information, in some examples, the user may select a particular content item and submit a request to access to selected content item via content client 112. Additionally, content client 112 may also provide to content item instance information service 115 information about certain content preferences desired by the user, such as certain plot lines, story arcs, virtual locations, levels, modes, characters, weapons, and the like. Content item instance information service 115 may then, based at least in part on the user's request, the user's preferences, and the telemetry information received from telemetry components 125, match the user's request to a particular instance of the user's selected content item.

In some examples, content item instance information service 115 may attempt to identify one or more instances of the selected content item having content attributes that match, or at least partially match, content attributes of the user's requested preferences. Content item instance information service 115 may obtain content attribute information for executing content item instances through a variety of different techniques. In some examples, content attribute information may be collected and provided as part of telemetry information made available from telemetry components 125, may be retrieved from scaling component 230 of FIG. 2, or may be otherwise made available to content item instance information service 115. Upon identifying one or more content item instances with content attributes that at least partially match the user's preferences, content item information service may then determine, based at least in part on telemetry information from telemetry components 125, whether there are any unoccupied user sessions for any of the identified content item instances. In some examples, content item instance information service 115 may then assign the user to one of the identified content item instances with at least one unoccupied user session. In some examples, the user may be assigned to the identified content item instance with at least one unoccupied user session that has content attributes that most closely matches the user's preferences. In other examples, the user may be assigned to a content item instance based on a combination of factors including, for example, the user's preferences, a number of unoccupied user sessions, and the like. For example, consider the scenario in which a user specifies five different content attribute preferences for a content item instance to join. Now suppose that a first content item instance matches all five of the user's preferences but only has one unoccupied user session, while a second content item instance matches four out of five of the user's preferences but has ten unoccupied user sessions. In this scenario, it may be advantageous to assign the user to the second content item instance, in order to keep the single remaining unoccupied user session of the first content item instance available for other users whose preferences may be even more strongly correlated to the first content item instance. Also, in some examples, content item instance information service 115 may provide information about identified content item instances with at least one unoccupied user session that at least partially match a user's preferences to content client 112 in order to allow the user to select one of the identified content item instances for assignment or to otherwise provide input for making such a selection.

In some examples, content item instance information service 115 may, instead of matching and assigning the user to an existing already launched and executing content item instance, request that scaling components 230 launch an additional content item instance to which to assign the user. This may occur, for example, when none of the existing content item instances within the fleet have any remaining unoccupied user sessions and/or when none of the existing content item instances within the fleet have content attributes that are determined to sufficiently match the user's requested content attribute preferences.

Once the user has been matched and assigned to a particular content item instance, content item instance information service 115 may provide an indication of the assigned content item instance (or instructions to launch a new content item instance) to scaling components 230. Scaling components 230 may, in turn, establish communications between a user session for the user and the assigned content item instance by, for example, instructing the assigned content item instance to communicate with content client 112 at user compute node 110. As set forth above, in some examples, these communications may include transmitting, by the assigned content item instance, state information, event information, rendered graphics and audio, and/or other information associated with the content item instance to the content client 112 corresponding to the user session. Also, in some examples, these communications may include transmitting, by the content client 112, input, such as control input (e.g., character movement, weapons firing, menu selections, etc.) to the assigned content item instance.

Thus, as described above, content item instance information service 115 may use content item instance-level telemetry information provided by telemetry components 125 to assist in the process of matching and assigning users sessions to content item instances. In addition to these matching techniques, content item instance-level telemetry information provided to content item instance information service 115 may also be used, for example, to provide content item instance-level feedback and metrics to developers and possibly other parties. In particular, as shown in both FIGS. 1 and 3, developer compute node 100 may access content item instance information service 115 to request content item instance-level information, such as a number of occupied user sessions for each executing content item instance, a number of unoccupied user sessions for each executing content item instance, content item instance duration information, memory usage by in each executing content item instance, and the like.

Referring back to FIG. 3, in addition to content item instance information service 115, telemetry routing function 302 may route telemetry information, though respective processing functions 303B-D, to content item fleet information service 304, historical information service 305, and other additional services 306. Content item fleet information service 304 may generally receive and provide content item fleet-level telemetry information to developers and/or other parties. Content item fleet-level information may include information regarding occupied user sessions within the fleet, unoccupied user sessions within the fleet, instance duration information for the fleet, memory usage by the fleet, a number of executing instances within the fleet, instance termination information, and the like. For occupied user sessions, the fleet-level information may include, for example, the total number of occupied user sessions for all fleet instances, an average number of occupied user sessions for all fleet instances, a number of occupied sessions in the fleet instance with the least occupied sessions, a number of occupied sessions in the fleet instance with the most occupied sessions and the like. For unoccupied user sessions, the fleet-level information may include, for example, the total number of unoccupied user sessions for all fleet instances, an average number of unoccupied user sessions for all fleet instances, a number of unoccupied sessions in the fleet instance with the least unoccupied sessions, a number of unoccupied sessions in the fleet instance with the most unoccupied sessions and the like. For instance duration information, the fleet-level information may include, for example, total, average, maximum, and minimum duration for fleet instances that terminated within a particular period as well as a number of instances that terminated within a particular period. For memory usage information, the fleet-level information may include, for example, total, average, maximum, and minimum memory usage for fleet instances.

In some examples, content item fleet information service 304 and/or content item instance information service 115 may allow developers or other parties to set alarms and/or other notifications such that they may be notified of certain events or conditions associated with content item fleets and/or instances. Some example conditions that may trigger alarms are a total number of occupied fleet sessions meeting, exceeding or falling below specified levels, one or more fleet instances having less than a specified number of occupied sessions, a total number of unoccupied fleet sessions meeting, exceeding or falling below specified levels, fleet instances having less than a specified average time duration, fleet instances having more than a specified average or maximum memory usage, and other conditions.

Historical information service 305 may generally receive, maintain, and provide historical information regarding content item fleets and/or content item instances. In some examples, historical information service may include historical information about content item fleets and/or content item instances that have been previously terminated and/or information about content item fleets and/or content item instances that may wholly are partially continue to be executed. Historical information service 305 may, for example, provide any, or all, of the instance-level information and or fleet-level information set forth in detail above and/or any other relevant historical information. In some examples, historical information may allow developers and/or other parties to request information for certain specifiable historical periods, such as for the past sixty or ninety days, or any other relevant period.

Figure 4:
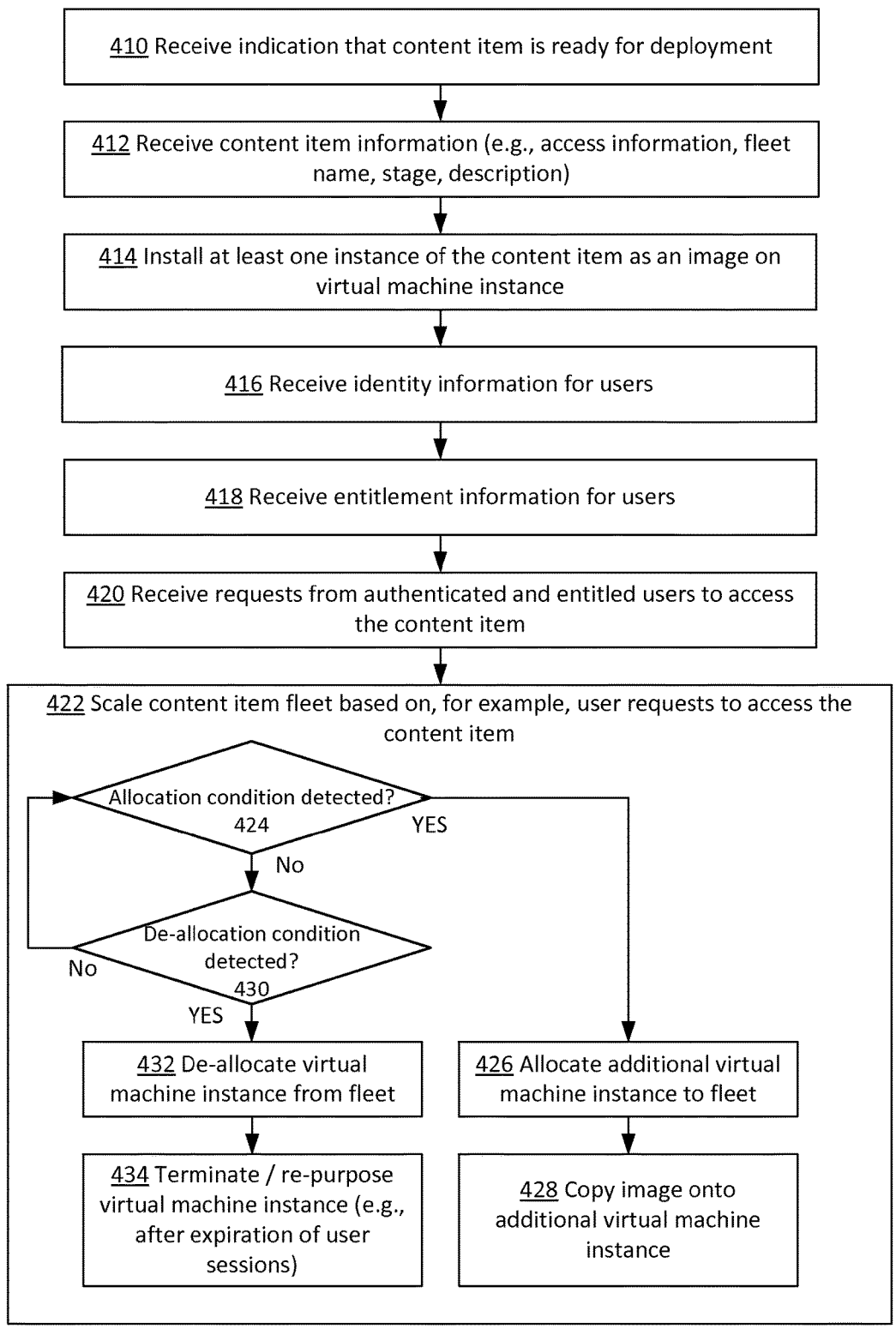
FIG. 4 is a diagram illustrating an example content deployment and scaling process that may be used in accordance with the present disclosure.

Some example processes for performing various aspects of the disclosed techniques will now be described in detail. In particular, FIG. 4 is a diagram illustrating an example content deployment and scaling process that may be used in accordance with the present disclosure. As set forth above, content may be deployed using a plurality of instances of the content item, referred to herein as a content item fleet. In some examples, one or more of the content item instances in the fleet may be configurable to have multiple simultaneously assigned user sessions. In some examples, all of the content item instances in the fleet may be configurable to have multiple simultaneously assigned user sessions. Also, in some examples, at least two content item instances in the fleet may execute on a single virtual machine instance. As shown in FIG. 4, at operation 410, an indication may be received that a content item is ready for deployment. As set forth above, the content item may include content, such as a video game, that is being developed and/or tested or content that is fully developed and tested and being sold or otherwise deployed to customers or other users. As also set forth above, in some examples, the content may be created using an SDK or other elements that are associated and/or integrated with various backend or other services or components that may host or otherwise interact with deployed instances of the content item, such as content item instance information service 115, instance interfaces 220A-N and 222A-N, and/or content execution components 120 of FIG. 2. In these examples, the SDK or other elements may provide code and other functionality built-in to the content created by the developer that may allow, for example, ingestion, configuration, provisioning and deployment of the content to be more easily and rapidly accomplished, such as by allowing the content to interact more efficiently with a multi-player video gaming or other multi-user environment. For example, an SDK used to create the content may assist in configuration of new user sessions for one or more users and collection of information about executing content item instances, such as a number of occupied user sessions, a number of unoccupied user sessions, content item instance duration, memory usage, and the like. The indication may, for example, be received by content execution components, such as content execution components 120 of FIG. 1 from a developer compute node, such as developer compute node 100 of FIG. 1. At operation 412, content item information is received. Such content items may include files, binaries, or code, such as binary files associated with a video game that has been created with the SDK associated with the content item instance information service 115 and/or content execution components 120. The information received at operation 412 may include, for example, information for accessing the content, such as a location at which the code of other data associated with the content item is stored or other information for accessing the content item. The information received at operation 412 may also include, for example, a name for a fleet of instances of the content item, a stage of development for the content item, a description of the content item, and other information. At operation 414, at least one instance of the content item is installed as an image on a virtual machine instance. Operation 414 may be performed based on, for example, the indication that the content item is ready for deployment and any associated content item information. In some examples, scaling component 230 of FIG. 2 may receive location information for the content item code and issue instructions for the content item code to be installed from the location identified in the received location information as an image on a particular virtual machine.

At operation 416, identity information for users is received. User identity information, such as identity information 107 of FIG. 1, may be received from developers or from other parties. As set forth above, identity information for users may include, for example, identity authentication information for authenticating the identity of the authorized users, such as a user name and password. As should be appreciated, user identity information may be received at any time and need not necessarily be received either before or after a particular content item is actually deployed. At operation 418, entitlement information is received. Entitlement information, such as entitlement information 106 of FIG. 1, may be received from developers or from other parties. As set forth above, entitlement information may include, for example, for various authorized users and indications of which content items are entitled to be access by the authorized users. As also set forth above, entitlement information may indicate entitlements at various levels of granularity, such as particular titles, particular versions, particular story arcs or plotlines, particular virtual locations, particular modes, particular characters, particular weapons, and the like. As should be appreciated, entitlement information may be received at any time and need not necessarily be received either before or after a particular content item is actually deployed.

At operation 420, requests are received from authorized and entitled users to access the content item. Some example techniques for authenticating users and determining and enforcing their respective entitlements are described in detail above and are not repeated here. At operation 422, the content item fleet for the content item is scaled based on, for example, the user requests received at operation 420. Scaling of the content item fleet may be performed by, for example, scaling component 230 of FIG. 2. In some examples, the scaling performed at operation 422 may include copying the image installed at operation 414 onto additional virtual machine instances based, at least in part, on the user requests received at operation 420. Also, in some examples, scaling of the content item fleet may include detecting of allocation and/or de-allocation conditions and performing various operations in response thereto.

In particular, at sub-operation 424, it is determined whether an allocation condition is detected. As set forth above, an allocation condition may include, for example, determining that the total and/or average number of unoccupied user sessions for all content item instances in the fleet have met or dropped below a particular quantity, determining that the total number of unoccupied user sessions for one or more individual content item instances in the fleet have met or dropped below a particular quantity, and/or other conditions. If, at sub-operation 424, an allocation condition is detected, then at sub-operation 426, an additional virtual machine instance may be allocated to the content item fleet. This allocation may occur based on, for example, the detection of the allocation condition. At operation 428, the image installed at operation 414 is copied onto the additional virtual machine instance, thereby enabling the launching of additional content item instances. The additional virtual machine may handle one or many additional users or sessions.

If no allocation condition is detected at sub-operation 424, then, at sub-operation 430, it is determined whether a de-allocation condition is detected. As set forth above, a de-allocation condition may include, for example, determining that the total and/or average number of unoccupied user sessions for all content item instances in the fleet have met or exceeded a particular quantity, determining that the total number of unoccupied user sessions for one or more individual content item instances in the fleet have met or exceeded a particular quantity, and/or other conditions. If no de-allocation condition is detected at sub-operation 430, then the process may return to sub-operation 424. If, at sub-operation 430, a de-allocation condition is detected, then at sub-operation 432, a virtual machine instance may be de-allocated from the content item fleet. This de-allocation may occur based on, for example, the detection of the de-allocation condition. At sub-operation 434, the de-allocated virtual machine instance may be terminated and/or repurposed. As set forth above, in some cases, it may not be advantageous to terminate and/or repurpose a de-allocated virtual machine instance immediately upon determining that a de-allocation condition has occurred. Rather, a determination may be made to stop assigning additional user sessions to content item instances on the de-allocated virtual machine instance and to terminate and/or repurpose the de-allocated virtual machine instance after its existing user sessions have expired.

It is noted that the detection of allocation and de-allocation conditions at sub-operations 424 and 430 are merely an example of how a content item fleet may be scaled. In particular, there is no requirement that sub-operations 424 and 430 must be performed in the order shown in FIG. 4 and may be performed in different orders and/or may be performed wholly or partially dependently or independently relative to one other. For example, in some cases, the determination of whether a de-allocation condition exists may be performed based, at least in part, on a clean-up process that may run at particular intervals and/or in response to certain configurable events, such as termination of user sessions. Additionally, in some examples, the determination of whether an allocation condition exists may be performed at particular intervals and/or in response to certain configurable events, such as generation of user sessions. Furthermore, it is noted that the allocation and/or de-allocation determination may also be performed based on historical data, such as a number of user sessions that have been generated or terminated over a particular time period.

Figure 5:
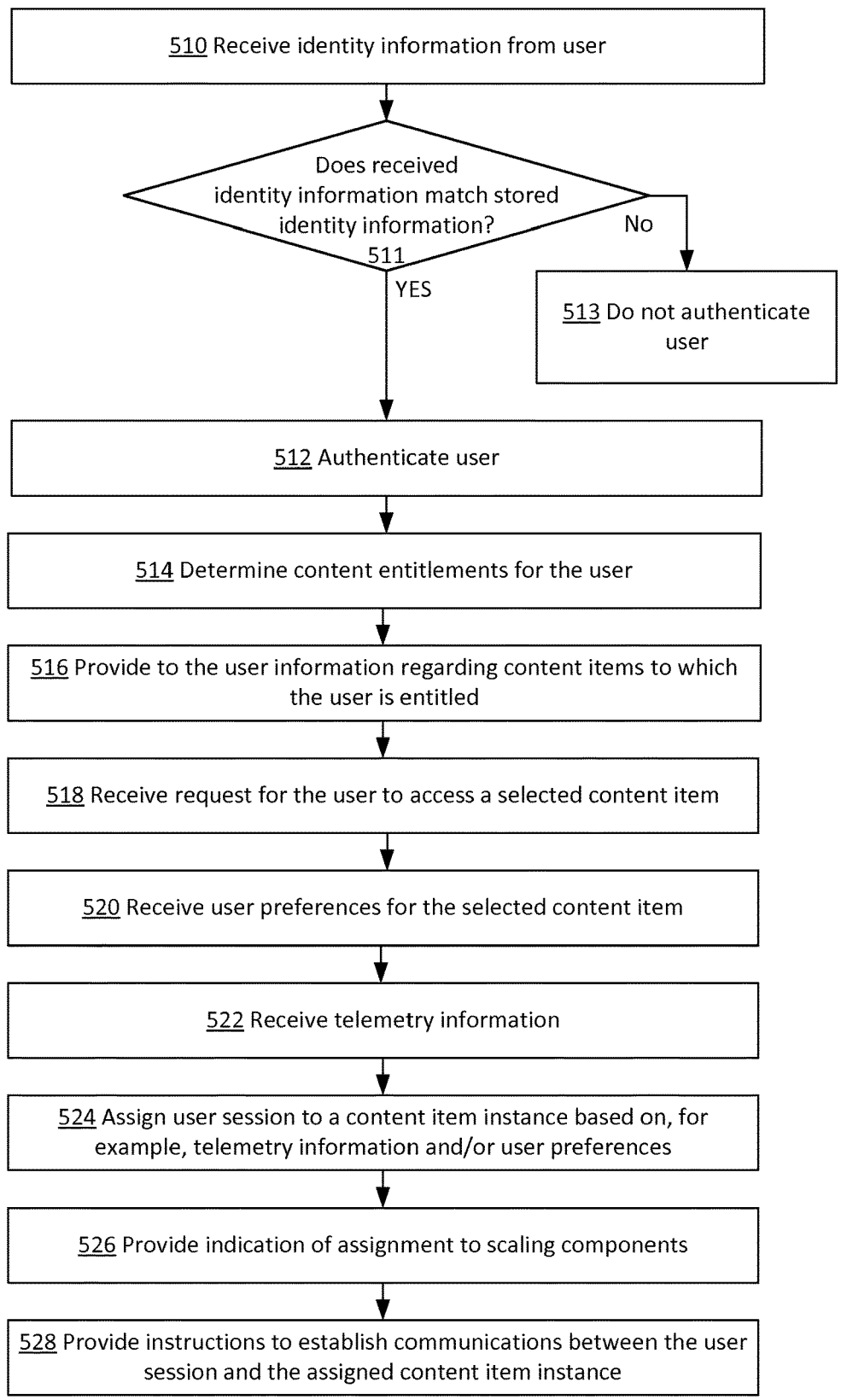
FIG. 5 is a diagram illustrating an example process content execution in accordance with the present disclosure.

FIG. 5 is a diagram illustrating an example process for content execution in accordance with the present disclosure. At operation 510, identity information may be received from a user that is attempting to gain access to content. For example, at operation 510, identity and entitlement services 105 of FIG. 1 may receive identity information from system interface 111 of user compute node 110 of FIG. 1. As set forth above, the identity information received at operation 510 may include, for example, a username and password for the user. At operation 511, it is determined whether the received identity information matches stored identity information. For example, identity and entitlement services 105 of FIG. 1 may attempt to match the identity information received at operation 510 to stored identity information, such as identity information 107 of FIG. 1. In some examples, a username and password received at operation 510 may be matched to a username and password within stored identity information. If a match is detected at operation 511, then, at operation 512, the user may be authenticated. If no match is detected at operation 511, then at operation 513, the user is not authenticated. As set forth above, if the user cannot be authenticated (e.g., if no match is determined), then the user may, for example, be denied access to any content and/or may be prompted to register, pay, and/or subscribe for access to content and/or may be redirected to various services for performing those operations.

At operation 514, content entitlements may be determined for the user. For example, as shown in FIG. 1, content item instance information service 115 may request content entitlement information for the user from identity and entitlement services 105. In some examples, stored entitlement information, such as entitlement information 106 of FIG. 1, may indicate content entitlement information for authenticated users, such as various content items that the user is entitled to access. At operation 516, information is provided to the user regarding content items to which the user is entitled. For example, content item instance information service 115 may provide, to content client 112, information about available content items that the user is entitled to access, such as a listing of all available content items or content items having certain content attributes, such as certain plot lines, story arcs, virtual locations, levels, modes, characters, weapons, and the like.

At operation 518, a request is received for the user to access a content item. For example, the user may employ the information provided at operation 516 to select a particular content item that the user wishes to access. Content client 112 may then submit a request to access a selected content item, which may be received, at operation 518, by content item instance information service 115. Additionally, at operation 520, user preferences for the selected content item are received. The user preferences may include, for example, certain plot lines, story arcs, virtual locations, levels, modes, characters, weapons, and the like desired by the user. At operation 522, telemetry information is received. For example, telemetry information regarding content item instances in a content item fleet may be received by content item instance information service 115 via telemetry components 125. In some examples, the received telemetry information may include an indication of user session availability on the content item fleet, such as an indication of whether there are any unoccupied user sessions for one or more content item instances in the fleet, a number of unoccupied user sessions for one or more content item instances in the fleet, or other availability information. Examples of some other telemetry information that may be received by content item instance information service 115 are described in detail above and are not repeated here. It is noted, that telemetry information may be received and updated repeatedly by content item instance information service 115, such as at one minute or five minute intervals or at any other desired times or intervals.

At operation 524, a user session associated with the user is assigned to a content item instance based on, for example, the telemetry information and/or the user preferences. For example, in some cases, content item instance information service 115 may, based on telemetry information, identify one or more executing content item instances with at least one unoccupied user session that have content attributes that match or partially match the user's preferences. In some examples, content item instance information service 115 may then assign the user to one of the identified content item instances. Also, in some examples, content item instance information service 115 may assign the user to a content item instance that at least partially matches one or more of the user preferences. Some other example techniques for user assignment are set forth in detail above and are not repeated here. As also set forth above, in some examples, content item instance information service 115 may, instead of matching and assigning the user to an existing already launched and executing content item instance, request that scaling components 230 launch an additional content item instance to which to assign the user. This may occur, for example, when none of the existing content item instances within the fleet have any remaining unoccupied user sessions and/or when none of the existing content item instances within the fleet have content attributes that are determined to sufficiently match the user's requested content attribute preferences.

At operation 526, an indication of the assigned content item instance may be provided to scaling components, such as scaling components 230 of FIG. 2. If the user is being assigned to a content item instance that has not yet been launched, then this may also be indicated as part of the indication provided at operation 526. At operation 528, instructions are provided to establish communications between the user session and the assigned content item. For example, scaling components 230 may instruct the assigned content item instance to communicate with the user session associated with content client 112 at the user compute node 110 operated by the user.

Figure 6:
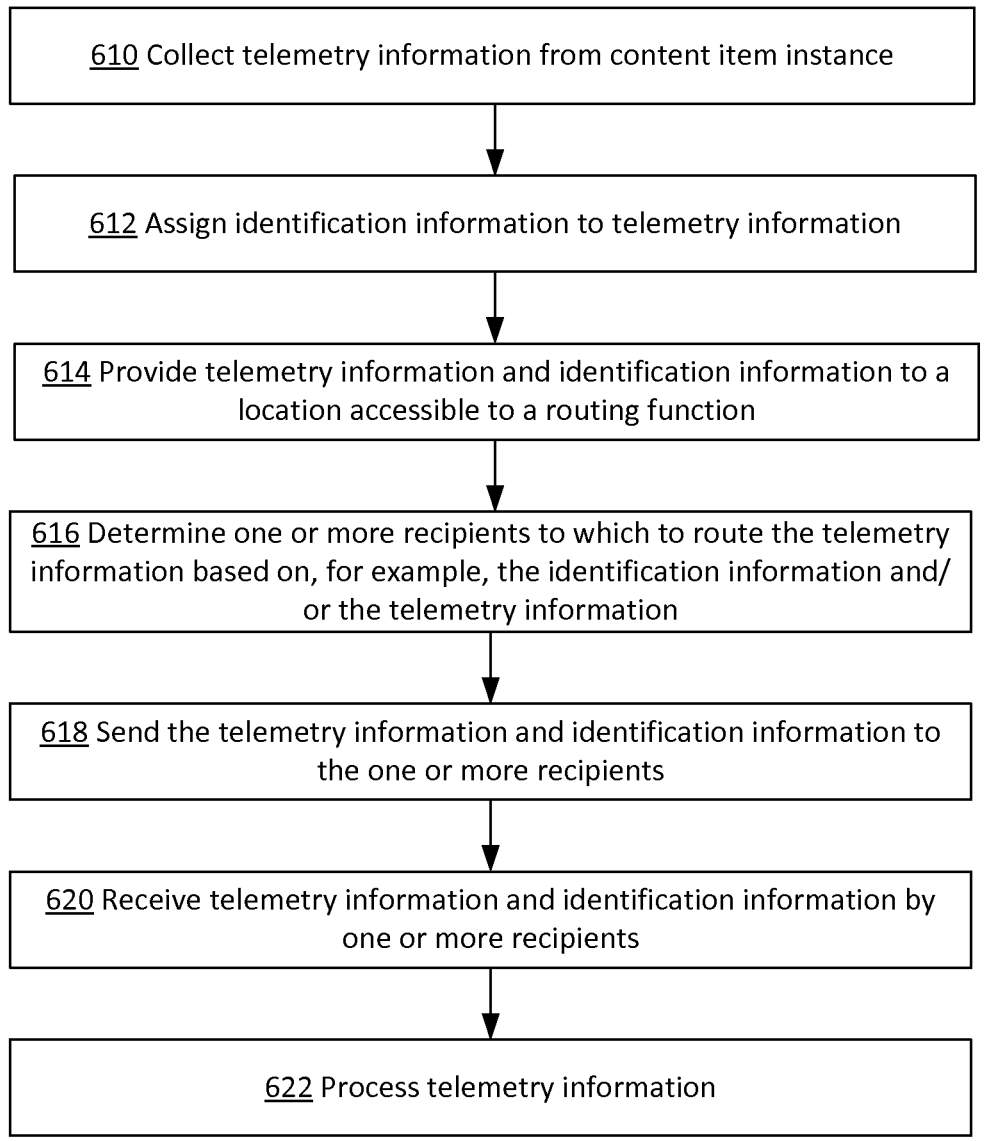
FIG. 6 is a diagram illustrating an example telemetry information routing process that may be used in accordance with the present disclosure.

FIG. 6 is a diagram illustrating an example telemetry information routing process that may be used in accordance with the present disclosure. At operation 610, telemetry information is collected from a content item instance. In some examples, telemetry information may be collected at operation 610 by proxy components 203 and 223 of FIG. 2, which may receive the information from content item instances 201A-N and 221A-N through instance interfaces 202A-N and 222A-N, respectively. As set forth above, in some examples, various instructions associated with instance interfaces 202A-N and 222A-N, such as one or more software development kits (SDKs) may be exposed and/or provided to developers. These instructions may assist in enabling the content item instances 201A-N and 221A-N to report the telemetry information to the proxy components 203 and 223 through instance interfaces 202A-N and 222A-N. The developers may, in turn, include, embed or otherwise associate these instructions within the content item that is made accessible for deployment. As described in detail above, telemetry information collected from each content item instance may include, for example, information regarding a number of occupied user sessions, a number of unoccupied user sessions, content item instance duration, memory usage, and the like.

At operation 612, identification information may be assigned to the telemetry information received at operation 610. For example, as set forth above, proxy components 203 and 223 may tag telemetry information with certain keys or other identification information according to a set of conventions. In one specific example, the telemetry information may be identified using the following format: fleet identifier/instance identifier/route identifier/timestamp/globally unique identifier (GUID). The fleet identifier may be an identifier for the particular content item fleet with which the telemetry information is associated. The instance identifier may be an identifier for the particular content item instance with which the telemetry information is associated. The route identifier may be an identifier that indicates one or more recipients (e.g., any or all of processing functions 303A-D of FIG. 3) to which the information should be sent.

At operation 614, the telemetry information and the identification information are provided to a location accessible to a routing function, such as telemetry landing 301 of FIG. 3 (which is accessible to telemetry routing function 302). As set forth above, in some examples, the telemetry information may be provided to telemetry landing 301 at regular repeating intervals, such as every minute or every five minutes. In some other examples, telemetry information may be provided as a continuous stream of information or at any other time or interval.

At operation 616, the telemetry information and the identification information are routed to one or more recipients based on, for example, the identification information and/or the telemetry information itself. For example, as set forth above, telemetry information may be routed to recipients such as any one or more of processing functions 303A-D of FIG. 3, which may be associated with and may process information for content item instance information service 115, content item fleet information service 304, historical information service 305, and additional services 306. Processing functions 303A-D may be associated with various services for content item instance information analysis, such as services 115 and 304-306. As set forth above, in some examples, instance-level information processing function 303A may be for information associated with each instance in a fleet of content item instances, fleet-level information processing function 303B may be for information associated with the fleet of content item instances, and historical information processing function 303C may be for historical information. In some cases, the telemetry information may be routed to one or more of processing functions 303A-D or other recipients based on, for example, the route identifier within the identification information assigned at operation 612. At operation 618, the telemetry information and the identification information are sent to the one or more recipients determined at operation 616. As set forth above, in some examples, any of telemetry routing function 302 and/or processing functions 303A-D may include compute services that execute based, at least in part, on events, such as the receiving of telemetry information for routing and/or processing. In some examples, implementation of telemetry routing function 302 and/or processing functions 303A-D using distributed computing-based (e.g., cloud-based) functions that execute code based, at least in part, on events may be advantageous by, for example, reducing the amount of computing resources and cost that may be required for routing and/or processing of telemetry information.

At operation 620, the telemetry information and the identification information are received by the one or more recipients, such as one or more of processing functions 303A-D. At operation 622, the telemetry information may be processed, which may include updating previously received telemetry information, organizing the telemetry information such that it may be efficiently accessed by developers, users or other parties, and generating any alarms or other notification based on the telemetry information, such as those described above. In addition, at operation 622, one or more of processing functions 303A-D may provide the telemetry information to the appropriate services (e.g., one or more of services 115 and/or 304-306). As set forth above, in some examples, the route identifier within the identification information assigned at operation 612 may be accessed by telemetry routing function 302 and any of processing functions 303A-D to indicate one or more recipients to which to route the telemetry information. As also set forth above, in some examples, instance-level processing function 303A may provide information to content item instance information service 115, fleet-level information processing function 303B may provide information to content item fleet information service 304, historical information processing function 303C may provide information to historical information service 305, and any number of additional processing functions 303D may provide information to any number of additional services 306. In some examples, any or all of services 115 and 304-306 may be at least partially accessible to a content item developer item for providing information to the content item developer.

Figure 7:
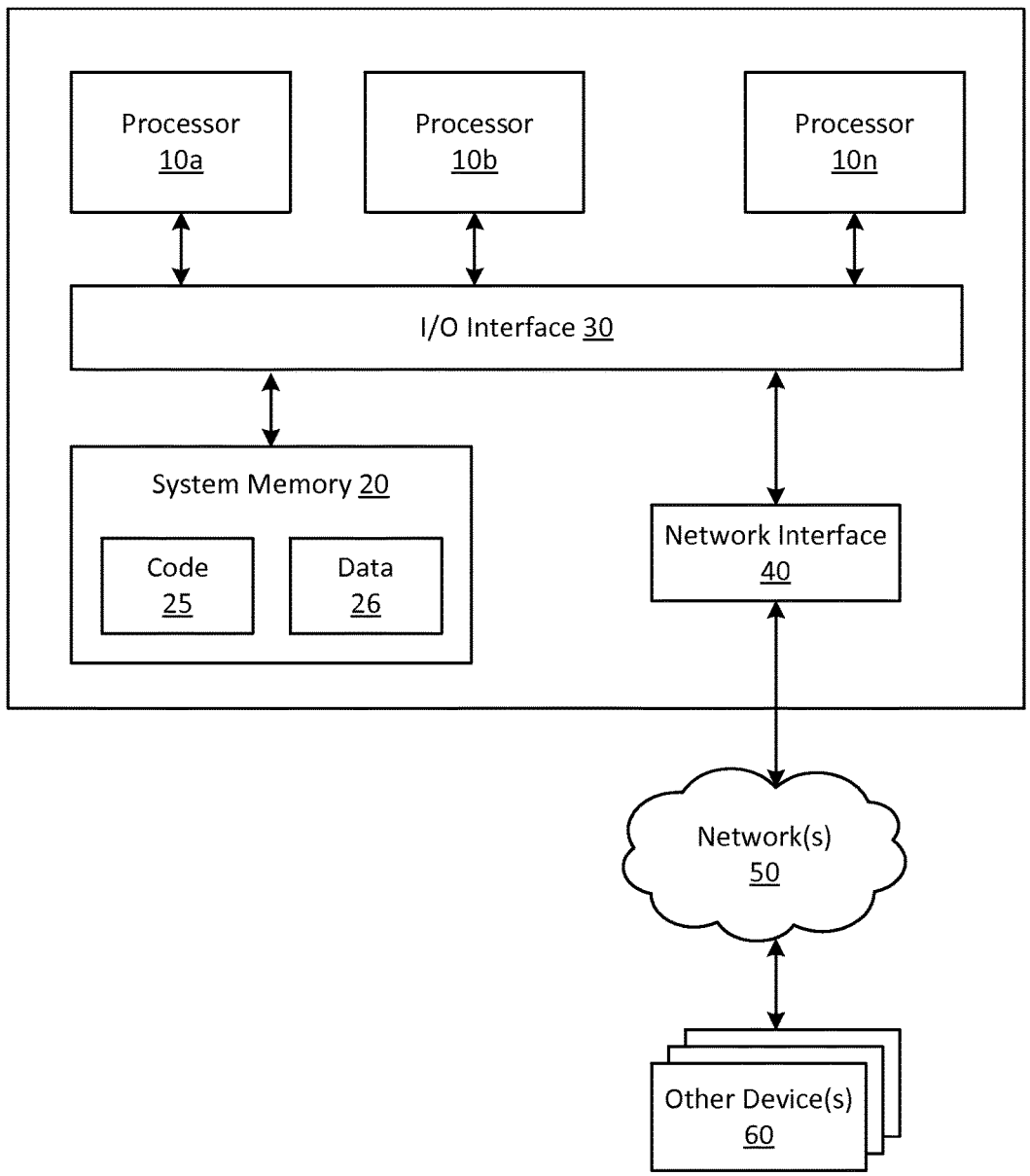
FIG. 7 is a diagram illustrating an example computing system that may be used in accordance with the present disclosure.

In at least some embodiments, one or more compute nodes that implement a portion or all of one or more of the technologies described herein may include or may be associated with a computer system that includes or is configured to access one or more computer-accessible media. A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes. FIG. 7 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA.

In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems. The term "computing device," as used herein, refers to at least all these types of devices and is not limited to these types of devices.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for deployment of a content item comprising:
one or more computing devices; and
one or more memories having stored thereon computer-executable instructions that, upon execution, cause the system to perform operations comprising:
receiving an indication that the content item is ready for the deployment, wherein the content item is deployed using a plurality of content item instances, and wherein one or more of the plurality of content item instances is configurable to have multiple simultaneously assigned user sessions, wherein the content item is created using a software development kit associated with a service that hosts the content item, wherein information regarding quantities of unoccupied user sessions is reported by each of the plurality of content item instances, and wherein the software development kit provides code embedded into the content item that reports the information regarding the quantities of unoccupied user sessions;
installing, based at least in part on the indication, at least a first content item instance as an image on a first virtual machine instance;
detecting a first condition associated with allocating an additional virtual machine instance to the plurality of content item instances, wherein the first condition comprises determining that a first average number of unoccupied user sessions for the plurality of content item instances has met or dropped below a first quantity, the first average number based on information provided at a first time;
allocating, based at least in part on the first condition, the additional virtual machine instance to the plurality of content item instances;
copying the image onto the additional virtual machine instance;
detecting a second condition associated with de-allocating a second virtual machine instance from the plurality of content item instances, wherein the second condition comprises determining that a second average number of unoccupied user sessions has met or exceeded a second quantity, the second average number based on information provided at a second time; and
de-allocating, based at least in part on the second condition, the second virtual machine instance from the plurality of content item instances.

2. The system of claim 1, wherein the first condition further comprises determining that a total number of unoccupied user sessions for the plurality of content item instances has met or dropped below a third quantity.

3. The system of claim 1, wherein the operations further comprise:
detecting a condition associated with de-allocating a second virtual machine instance from the plurality of content item instances;
de-allocating, based at least in part on the condition, the second virtual machine instance from the plurality of content item instances; and
performing at least one of terminating or re-purposing the second virtual machine instance.

4. The system of claim 1, wherein the second condition further comprises determining that a total number of unoccupied user sessions for the plurality of content item instances meets or exceeds a third quantity.

5. A method for deployment of a content item comprising:
receiving an indication that the content item is ready for the deployment, wherein the content item is deployed using a plurality of content item instances, and wherein one or more of the plurality of content item instances is configurable to have multiple simultaneously assigned user sessions, wherein the content item is created using a software development kit associated with a service that hosts the content item, and wherein information regarding quantities of unoccupied user sessions is reported by each of the plurality of content item instances, and wherein the software development kit provides code embedded into the content item that reports the information regarding the quantities of unoccupied user sessions;
installing, based at least in part on the indication, at least a first content item instance as an image on a first virtual machine instance;
detecting a first condition associated with allocating an additional virtual machine instance to the plurality of content item instances, wherein the first condition comprises determining that a first average number of unoccupied user sessions for the plurality of content item instances has met or dropped below a first quantity, the first average number based on information provided at a first time;

allocating, based at least in part on the first condition, the additional virtual machine instance to the plurality of content item instances;

copying the image onto the additional virtual machine instance;

detecting a second condition associated with de-allocating a second virtual machine instance from the plurality of content item instances, wherein the second condition comprises determining that a second average number of unoccupied user sessions has met or exceeded a second quantity, the second average number based on information provided at a second time; and de-allocating, based at least in part on the second condition, the second virtual machine instance from the plurality of content item instances.

6. The method of claim 5, wherein the first condition further comprises determining that a total number of unoccupied user sessions for the plurality of content item instances has met or dropped below a third quantity.

7. The method of claim 5, further comprising:
performing at least one of terminating or re-purposing the second virtual machine instance.

8. The method of claim 5, wherein the second condition further comprises determining that a total number of unoccupied user sessions for the plurality of content item instances meets or exceeds a third quantity.

9. The method of claim 5, further comprising authenticating users for which a plurality of requests to access the content item is received.

10. The method of claim 5, further comprising determining, based at least in part on stored information, that users are entitled to access the content item.

11. The method of claim 5, wherein at least two of the plurality of content item instances execute on a single virtual machine instance.

12. The method of claim 5, wherein the content item is a video game.

13. One or more non-transitory computer-readable storage media having stored thereon instructions that, upon execution on at least one compute node, cause the at least one compute node to perform operations comprising:

receiving an indication that a content item is ready for deployment, wherein the content item is deployed using a plurality of content item instances, and wherein one or more of the plurality of content item instances is configurable to have multiple simultaneously assigned user sessions, wherein the content item is created using a software development kit associated with a service that hosts the content item, and wherein information regarding quantities of unoccupied user sessions is reported by each of the plurality of content item instances, and wherein the software development kit provides code embedded into the content item that reports the information regarding the quantities of unoccupied user sessions;

installing, based at least in part on the indication, at least a first content item instance as an image on a first virtual machine instance;

detecting a first condition associated with allocating an additional virtual machine instance to the plurality of content item instances, wherein the first condition comprises determining that a first average number of unoccupied user sessions for the plurality of content item instances has met or dropped below a first quantity, the first average number based on information provided at a first time;

allocating, based at least in part on the first condition, the additional virtual machine instance to the plurality of content item instances;

copying the image onto the additional virtual machine instance;

detecting a second condition associated with de-allocating a second virtual machine instance from the plurality of content item instances, wherein the second condition comprises determining that a second average number of unoccupied user sessions has met or exceeded a second quantity, the second average number based on information provided at a second time; and de-allocating, based at least in part on the second condition, the second virtual machine instance from the plurality of content item instances.

14. The one or more non-transitory computer-readable storage media of claim 13, wherein the first condition further comprises determining that a total number of unoccupied user sessions for the plurality of content item instances has met or dropped below a third quantity.

15. The one or more non-transitory computer-readable storage media of claim 13, wherein the operations further comprise:
performing at least one of terminating or re-purposing the second virtual machine instance.

16. The one or more non-transitory computer-readable storage media of claim 13, wherein the second condition further comprises determining that a total number of unoccupied user sessions for the plurality of content item instances meets or exceeds a third quantity.

17. The one or more non-transitory computer-readable storage media of claim 13, wherein the operations further comprise authenticating users for which a plurality of requests to access the content item is received.

18. The one or more non-transitory computer-readable storage media of claim 13, wherein the operations further comprise determining, based at least in part on stored information, that users are entitled to access the content item.

19. The one or more non-transitory computer-readable storage media of claim 13, wherein at least two of the plurality of content item instances execute on a single virtual machine instance.

20. The one or more non-transitory computer-readable storage media of claim 13, wherein the content item is a video game.

* * * * *